United States Patent [19]

Busselman et al.

[11] Patent Number: 4,942,015
[45] Date of Patent: Jul. 17, 1990

[54] METHOD FOR PREVENTING AND REPAIRING VIBRATIONAL DAMAGE TO NUCLEAR FUEL RODS

[75] Inventors: Gary J. Busselman, Richland; Adolfo Reparaz, Kennewick, both of Wash.

[73] Assignee: Advanced Nuclear Fuels, Corp., Richland, Wash.

[21] Appl. No.: 403,991

[22] Filed: Sep. 5, 1989

Related U.S. Application Data

[60] Continuation of Ser. No. 153,124, Feb. 8, 1988, abandoned, which is a division of Ser. No. 48,478, May 6, 1987, Pat. No. 4,784,825, which is a continuation of Ser. No. 630,878, Jul. 13, 1984, abandoned, which is a continuation-in-part of Ser. No. 487,907, Apr. 25, 1983, abandoned, which is a continuation-in-part of Ser. No. 461,276, Jan. 26, 1983, abandoned.

[51] Int. Cl.⁵ ............................................. G21C 19/00
[52] U.S. Cl. ..................................................... 376/261
[58] Field of Search ............... 376/261, 260, 438, 447, 376/446, 442, 399

[56] References Cited

U.S. PATENT DOCUMENTS

| | | | |
|---|---|---|---|
| 3,133,867 | 5/1964 | Frisch | 376/438 |
| 3,163,583 | 12/1964 | Widmer et al. | 376/438 |
| 3,314,860 | 4/1967 | Wilman | 376/446 |
| 4,056,441 | 11/1977 | Marmonier et al. | 376/438 |
| 4,110,160 | 8/1978 | Hayashi et al. | 376/438 |
| 4,416,852 | 11/1983 | Nylund | 376/438 |
| 4,508,679 | 4/1985 | Matzner et al. | 376/438 |
| 4,576,778 | 3/1985 | Ferree et al. | 376/203 |
| 4,578,240 | 3/1986 | Cadwell | 376/442 |
| 4,650,638 | 3/1987 | Coussau | 376/260 |
| 4,673,545 | 6/1987 | Cooke et al. | 376/261 |
| 4,784,825 | 11/1988 | Busselman et al. | 376/446 |

FOREIGN PATENT DOCUMENTS

| | | |
|---|---|---|
| 0117073 | 8/1984 | European Pat. Off. . |
| 0171210 | 2/1986 | European Pat. Off. ............ 376/261 |
| 0191359 | 8/1986 | European Pat. Off. ............ 376/260 |
| 2379744 | 9/1978 | France . |
| 2477754 | 9/1981 | France . |
| 2517868 | 6/1983 | France ............................... 376/446 |
| 0117183 | 6/1985 | Japan . |
| 0096282 | 5/1986 | Japan . |

OTHER PUBLICATIONS

"A New Solution to the Baffle Jetting Problem", Raparaz et al.; Technical Publishing, Sep. 1984, pp. 46–49.
"Protection of Fuel Bundles Against Baffle Jetting", Raparaz; American Nuclear Society 1984 Winter Meeting.
"Performance of Fuel Rod Clips", Raparaz et al.; American Nuclear Society 1984 Winter Meeting.

Primary Examiner—Daniel D. Wasil
Attorney, Agent, or Firm—Lawrence C. Edelman; Volker R. Ulbrich

[57] ABSTRACT

The fuel rods located in areas of a nuclear reactor core where water jetting damage to the rods can occur are secured together by a clip, in order to change the mass subject to fretting damage. The change of mass changes the amplitude of the induced fuel rod vibration, thus reducing possible fuel rod fretting and/or damage. To repair such damage, the combination of clip(s) and an inert rod are used to replace a damaged fuel rod.

5 Claims, 3 Drawing Sheets

METHOD FOR PREVENTING AND REPAIRING VIBRATIONAL DAMAGE TO NUCLEAR FUEL RODS

RELATED APPLICATIONS

This application is a continuation of Ser. No. 07/153,124 filed 2/8/88 (now abandoned), which was a divisional of Ser. No. 048,478 filed 5/6/87 (now U.S. Pat. No. 4,784,825), which was a continuation of Ser. No. 630,878 filed 7/13/84 (now abandoned), which was a continuation-in-part of the previously filed Ser. No. 487,907 filed 4/25/83 (now abandoned), which was a continuation-in-part of Ser. No. 461,276 filed 1/26/83 (now abandoned).

FIELD OF THE INVENTION

This invention pertains to apparatus for reducing and/or eliminating fretting and/or vibrational damage of nuclear fuel rods, and for repairing such damage.

BACKGROUND OF THE INVENTION

Nuclear reactors of the pressurized water type make use of high velocity water flow in order to remove the heat from the fuel rods in the reactor core. The cooling water travels to the core through a variety of passages one of which is immediately adjacent to the edge of the reactor core. The material separating core coolant from the incoming coolant is stainless steel plate approximately 2 inches thick, and is known as the Baffle Plate. The pressure of the water outside the baffle may be 30 pounds per square inch higher than that within the reactor core. Occasionally, there are gaps between the various plates which make up the core baffle. The differential water pressure between the outside of the baffle and the inside cause the water to flow rapidly through these gaps. This water flow is referred to as a "water jet" and since the reactor core is essentially full of fuel rods the water jet impinges on or very near a fuel rod. The usual water flow within a reactor core is bottom to top, parallel to the fuel rods. The baffle gap induced jet flow is perpendicular to the usual water flow. When the baffle jet strikes the fuel rod from the side it tends to induce a vibration into the fuel rod. This vibration tends to cause excessive wear on the fuel rods where they contact their normal support points which are called spacers. This type of wear is known as fretting and may proceed completely through the fuel rod cladding which results in escape of fission products from the nuclear fuel into the reactor cooling water. Fission products in the cooling water make normal reactor maintenance more difficult and much more expensive to the utility. Attempts at preventing or closing the baffle gaps have not been satisfactory. Some utilities have considered rerouting the cooling water prior to entering the core, so as to reduce the differential pressure which causes the jetting. This rerouting, however, is extremely expensive and requires a lengthy reactor shutdown.

SUMMARY OF THE INVENTION

The invention relates to a means for either or both preventing or at least reducing the possibility of damage in nuclear fuel rods subjected to induced vibration, and for repairing such damage. Fuel rods in pressurized water type nuclear reactors are sometimes introduced to impinging water jets and differential pressures that can cause the fuel rods to vibrate and eventually become worn or damaged.

In order to eliminate or reduce damage due to vibrational wear, known as fretting, in one embodiment the invention utilizes a plurality of removable clips to secure together at least two, and preferrably four or five fuel rods. The rods are secured at various locations along the length or mid-portion of the fuel rod assembly. In a preferred embodiment, the clips are usually placed in the corner of the assembly, because this is usually the section of the assembly which receives the impinging water jet.

When the rods are secured together, their increased or combined mass will vibrate at much lower amplitudes thus eliminating the problem of fretting.

An inert rod is placed or disposed amongst the clip secured fuel rods to secure each clip against axial movement along the fuel assembly. In another embodiment of the invention, the inert rod is used in combination with the clips to replace a damaged fuel rod, for repairing a fuel rod assembly.

This invention will be better understood and shall become more apparent with reference to the following detailed description considered in conjunction with the accompanying drawings, in which like items or elements may be identified with the same reference number.

DETAILED DESCRIPTION OF THE INVENTION

Generally speaking, the invention seeks to resolve the problem of resonance in fuel rods disposed in a pressurized water type nuclear reactor. The problem of resonance is caused by "water jetting". Gaps and/or separations may occur in the baffle joints of the core baffle plates. These gaps allow a jet of water to impinge upon adjacent fuel rods. Fuel rods have not been designed to withstand the transverse forces created by these water jets.

The invention overcomes this problem by securing together the fuel rods adjacent to the gaps in order to change their vibrational amplitudes. Experiments have shown that severe fuel rod vibration can begin with as little as two pounds per square inch differential pressure acting through a baffle gap of 0.030 inches. By placing two of the clips at approximately ⅓ and ⅔ of the axial distance between the normal fuel rod spacers, noticeable fuel rod vibration does not occur until a differential pressure of 12 pounds per square inch is reached acting through a gap of 0.030 inches. The actual number of clips required to correct a vibration condition will depend upon the number of rods tied together by each clip and the locations selected for placement about the fuel rod assembly.

Figure 1:
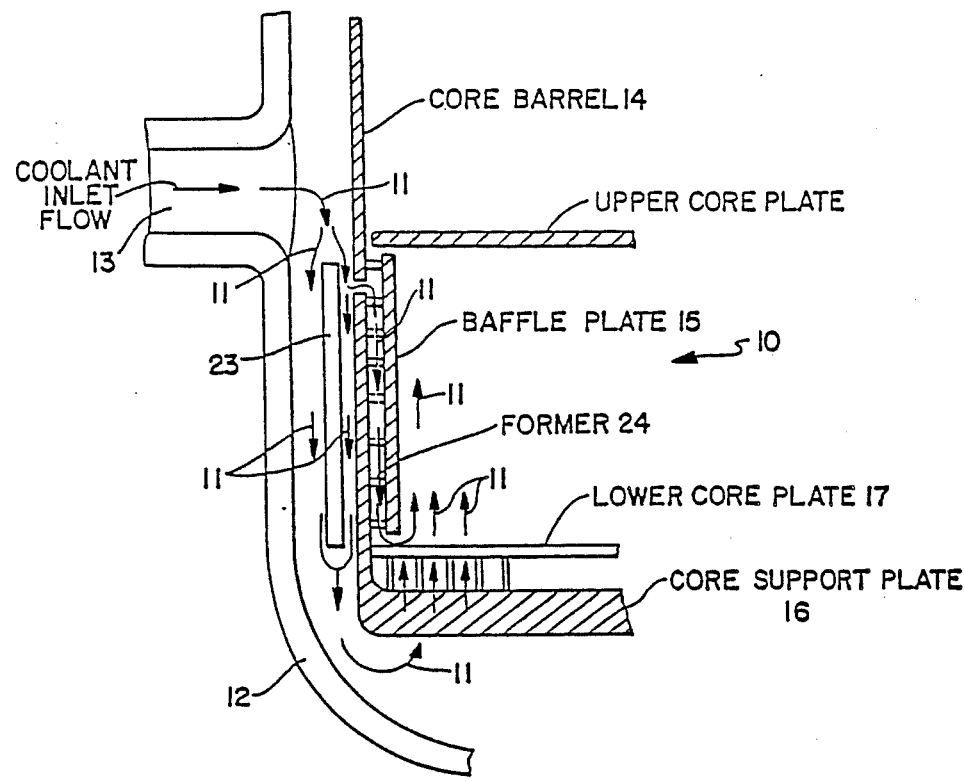
FIG. 1 is a schematic cross-section of a typical pressurized water reactor core illustrating the flow of water past the fuel rods of the core.

With reference to FIG. 1, a typical reactor core 10 is shown for a pressurized water type reactor 12. The following cooling water path to core 10 is depicted by arrows 11. The cooling water enters the inlet 13 and proceeds downwardly past the outside of the core barrel 14 and baffle plate 15. The water enters core 10 through support and lower core plates 16 and 17, respectively. The water flows past the fuel rods 22 (FIG. 2) in a parallel direction from bottom to top. Normal operation of this reactor 12 does not contemplate any transverse or perpendicular water flow against the fuel rods. The fuel rods and fuel assemblies (not shown) are not, therefore, designed to withstand any differentials in pressure or forces generated in the transverse direction.

Figure 2:
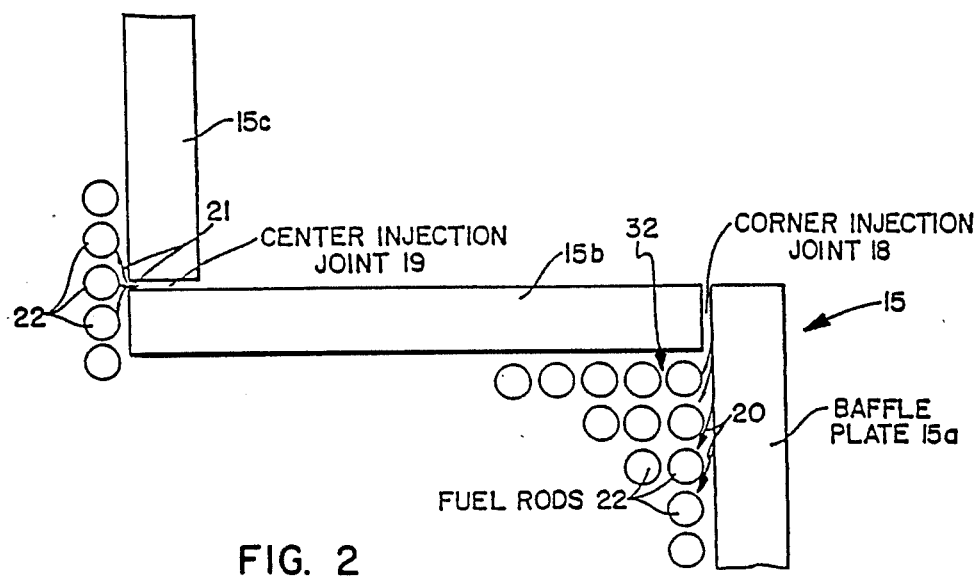
FIG. 2 is a partial schematic plan or top view of the core of FIG. 1, illustrating the problem of water jetting due to gaps or separations in the baffle joints of the baffle plates.

Referring to FIG. 2 an impingement condition is shown for the reactor 12 of FIG. 1. The baffle plate 15 is shown in top view, in three sections designated 15a, 15b, and 15c. Gaps can occur in the baffle joints 18 and 19, respectively, such that water jets can be created. The flow paths for the water jets are shown by respective arrows 20 and 21. These water jets 20 and 21, respectively, impinge at transverse or perpendicular angles to the fuel rods 22, creating the aforementioned resonant condition.

The cross-flow 20 and 21 is a high velocity jetting because a pressure differential is established between the downward flow 11 between the barrel 14 and annulus 23 and former plates 24, and the upward flow 11 through the core 10 inside the barrel 14. The high velocity jetting 20 and 21 induces excessive rod motion producing severe wear and degredation to rods 22.

Figure 3:
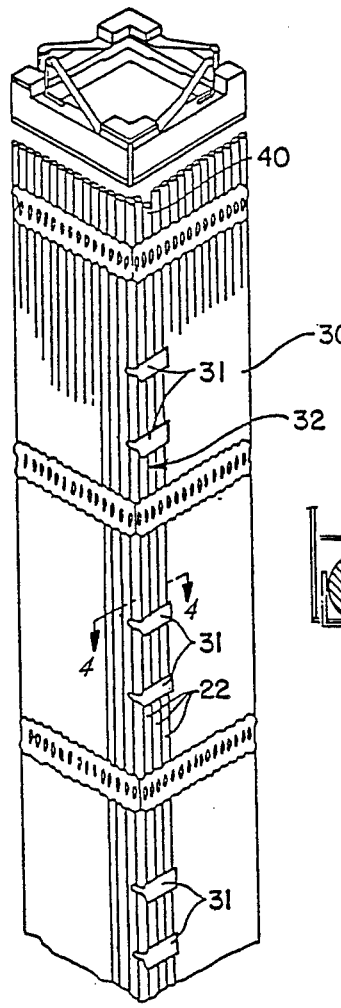
FIG. 3 is a partial schematic perspective view of a fuel rod assembly disposed in the nuclear reactor core of FIG. 1, and dipicting the apparatus of this invention.

Referring to FIG. 3 a typical fuel rod assembly 30, is depicted for core 10 of FIGS. 1 and 2. The fuel rods 22 of assembly 30 are shown braced together by a clip 31 at a corner section 32 thereof. This corner section is the corner section 32 shown in FIG. 3. The clip 31 is designed to secure together four or five fuel rods 22 as shown in greater detail in FIG. 4. The clips 31 effect the vibrational amplitude of the fuel rods 22 by changing their overall mass. Thus, the secured rods 22 act as a combined or increased mass, which causes the vibrational amplitude of the rods to decrease. This vibrational change prevents the severe resonant condition which causes wear and fretting of the rods.

The rods 22 of the center gap 19 can similarly be secured to prevent or reduce severe vibrations.

The clips 31 are placed along the length or mid-portion of the assembly 30 as shown. The number of clips and their location about the assembly 30 depends upon the severity of the pressure differential, the number of rods 22 which are secured by clip 31, and the length of the assembly 30.

Generally speaking, it has been found that between 10 and 25 clips are needed for each assembly experiencing the water jet induced vibration.

The clips 31 are generally secured to the rods 22 and assembly 30 prior to installing the fuel rods or assemblies into the core. Alternatively, the clips 31 can be placed or inserted onto the fuel rods of a completed fuel rod assembly 30. If necessary, the clips are removable in a "non-parallel plane relative to the longitudinal axis of the fuel rods" from a fuel rod assembly 30 by merely pulling the clips 31 in a direction substantially perpendicular to the axis of the fuel rods 22. Accordingly, the clips 31 are removed from the fuel rod assembly 30 without requiring even partial disassembly of the latter. Typically, the clips 31 may be removed when a fuel rod assembly 30 is to be moved from a peripheral location to an interior location in the core 10 to maximize the flow of coolant through the fuel rod assembly 30. Fuel rod assemblies 30 are not subject to baffle jetting at interior locations within core 10. A tool for removing clips 31 is disclosed in co-pending application Ser. No. 668,635, entitled "Remotely Controlled Apparatus For Removing Clips From Nuclear Fuel Assemblies", filed Nov. 6, 1984 (assigned to the same assignee as the present invention).

The clips 31 can be made of inconel or stainless steel.

Figure 6:
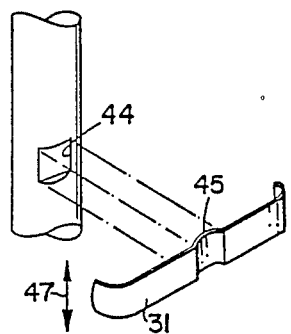
FIG. 6 is a cut-away perspective view of a portion of the section depicted in FIG. 4.
Figure 4:
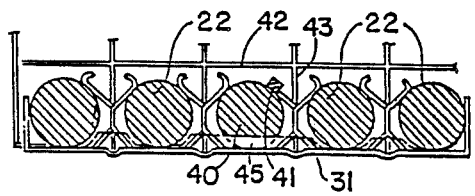
FIG. 4 is an enlarged plan or top view of one of the clips of FIG. 3, viewed along lines 4—4 showing the attachment of the clip about the fuel rods of the assembly.
Figure 5:
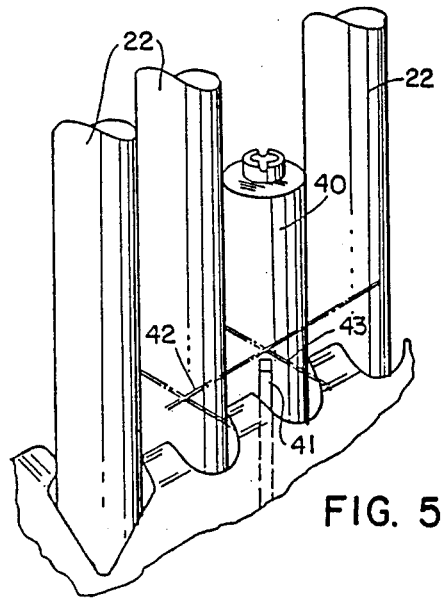
FIG. 5 is an enlarged cut-away perspective view of a section of the fuel rod assembly shown in FIG. 3.

In order to prevent any of the clips 31 from shifting, generally in an axial direction about said assembly 30, an inert rod 40 is placed amongst secured fuel rods 22 in the assembly 30, as shown in FIGS. 3, 4 and 5. Referring to FIGS. 5 and 6, the inert rod 40 has a tab 41 welded along its length, which tab 41 abuts against assembly spacers 42 and 43. This tab 41 prevents rotation of rod 40 within the fuel rod bundle, and maintains notches 44 (typical) in contact with a dimple abutment 45 (typical) of each clip 31. Contact of abutment 45 of each clip 31 with their respective notches 44 prevents slippage or movement (arrows 47) of the clips 31 with respect to the fuel rod assembly 30, due to relaxation of the spring force of the clips from irradiation, and/or due to the flow induced vibrations.

Figure 7:
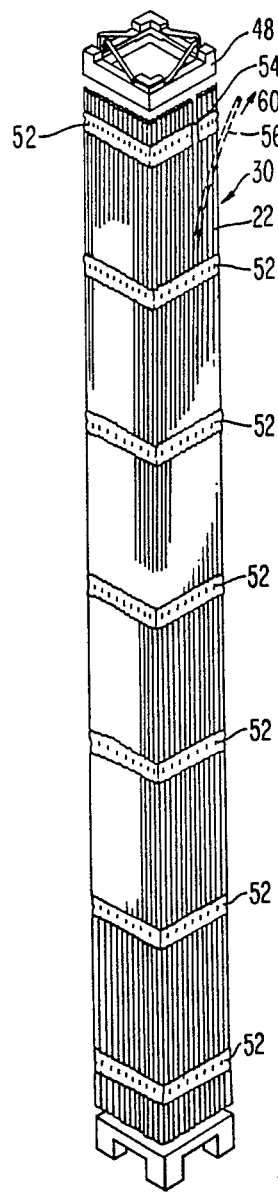
FIG. 7 is a pictorial view of a damaged fuel rod being removed from a fuel rod assembly.

In instances where damage to a fuel rod assembly 30 has occurred due to vibrational damage known as "baffle jetting", the damage is usually limited to fuel rods 22 located in the periphery of a fuel assembly. To replace a damaged fuel rod 22 located even in the periphery of a fuel rod assembly 30, typically first requires destructive removal of an existing upper tie plate 48 (see FIG. 7), to permit a damaged fuel rod to be slid out of the grid spacers 52 and replaced. Such a repair process is very time consuming and expensive.

Figure 9:
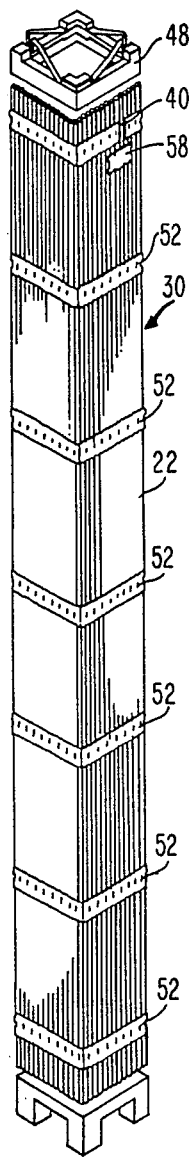
FIG. 9 is an isometric view of one of the clips of one embodiment of the invention.
Figure 8:
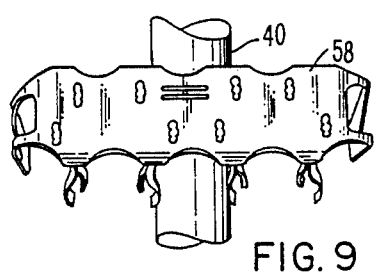
FIG. 8 is a pictorial view of a repaired fuel rod assembly.

With reference to FIGS. 4, 7, 8 and 9, the clips 31 or 58 in combination with an inert rod 40, permit easy replacement of a damaged peripheral fuel rod 56 of a fuel rod assembly 30. The method of repair involves cutting through the uppermost grid spacer 52 in an area 54 lying over a portion of the damaged rod 56. The upper portion of the rod 56 is then pulled through the cut portion away from the fuel rod assembly 30, and next pulled in the direction of arrow 60, to slide the rod 56 out of the lower grid spacers 52, for removal from fuel assembly 30. In this example, a fuel rod clip 58 (or 31) is welded at an appropriate location to an inert rod 40 as shown in FIG. 9. The inert rod 40 is then slid into the lower grid spacers 52. The upper portion of the inert rod is pushed laterally through the cut in the uppermost grid spacer 52, concurrent with pushing the clip 58 (or 31) into engagement with fuel rods 22 adjacent or juxtaposed to the inert rod 40, as shown in FIG. 8. In this manner the clip 58 (or 31) serves to support the inert rod 40 via attachment to the adjacent or juxtaposed fuel rods 22 thereto. In the preferred embodiment the clip 58 is located close to the uppermost grid spacer 52 in an area where the clip 58 engages fuel rods 22 where no power is being generated from the fuel rods 22. Consequently, local overheating of the associated fuel rods 22 is avoided.

Although particular embodiments of the present invention have been shown and described, other embodiments may occur to those of ordinary skill in the art which fall within the true spirit and scope of the appended claims.

What is claimed is:

1. In a fuel rod assembly including a plurality of spaced apart grid spacers for holding a plurality of fuel rods of said assembly in a predetermined position within said assembly, a tie plate located at the top of said assembly and rigidly secured to the ends of said fuel rods, a method for repairing a fuel rod assembly having a damaged peripherally located fuel rod, by replacing said damaged fuel rod with an inert rod, comprising the steps of:

removing from the uppermost one of said plurality of grid spacers a sufficient portion of said grid spacer to free said damaged fuel rod;

pulling the freed upper portion of said damaged fuel rod through the removed portion of said grid spacer, away from said fuel rod assembly;

pulling said damaged fuel rod upward to slide it out of the other ones of said grid spacers and ultimately out of said fuel rod assembly;

sliding said inert rod into the space and grid spacer locations formerly occupied by said damaged fuel rod;

pushing the upper end of said inert rod through the removed portion of the uppermost one of said grid spacers; and securing said inert rod to selected ones of said fuel rods juxtapositioned on either side of said inert rod, thereby securing said inert rod into said fuel rod assembly.

2. The method of claim 1, wherein said step of securing includes clipping together said inert rod with said selected ones of said fuel rods.

3. The method of claim 1 wherein said step of securing further includes changing the mass of said plurality of fuel rods for reducing vibrational amplitudes of said fuel rod assembly due to baffle jetting, thereby substantially reducing subsequent vibrational damage to said either or both said plurality of fuel rods and fuel rod assembly.

4. A method of eliminating or at least reducing vibrational damage to fuel rods on the periphery of a nuclear fuel rod assembly having a polygonal cross-section disposed within a reactor core, which rods are exposed to water jets within said core, comprising selecting from said peripheral rods, less than the number of rods on the periphery of said assembly, which will be subject to vibrational damage due to impingement of said water jets, securing together as a combined mass a plurality of only peripheral fuel rods including said selected rods, and exposing said selected rods to water jets within said core, whereby the vibration amplitudes of said secured rods are changed and damage to said selected rods is reduced or eliminated.

5. A method as defined in claim 4, wherein said secured rods are joined together by applying spring clips to them, which clips span all said secured plurality of peripheral rods and are joined to each of said secured plurality of peripheral rods.

* * * * *